July 30, 1963   H. E. McKIBBEN ETAL   3,099,115
MACHINE FOR PACKAGING LOOSE ARTICLES SUCH AS BLUEBERRIES
Filed Jan. 15, 1962   4 Sheets-Sheet 1

INVENTOR.
Horace E. McKibben
Paul T. Jones
BY
Otto A. Earl
ATTORNEY

July 30, 1963     H. E. McKIBBEN ETAL     3,099,115
MACHINE FOR PACKAGING LOOSE ARTICLES SUCH AS BLUEBERRIES
Filed Jan. 15, 1962     4 Sheets-Sheet 3

INVENTOR.
Horace E. McKibben
Paul F. Jones
BY
ATTORNEY

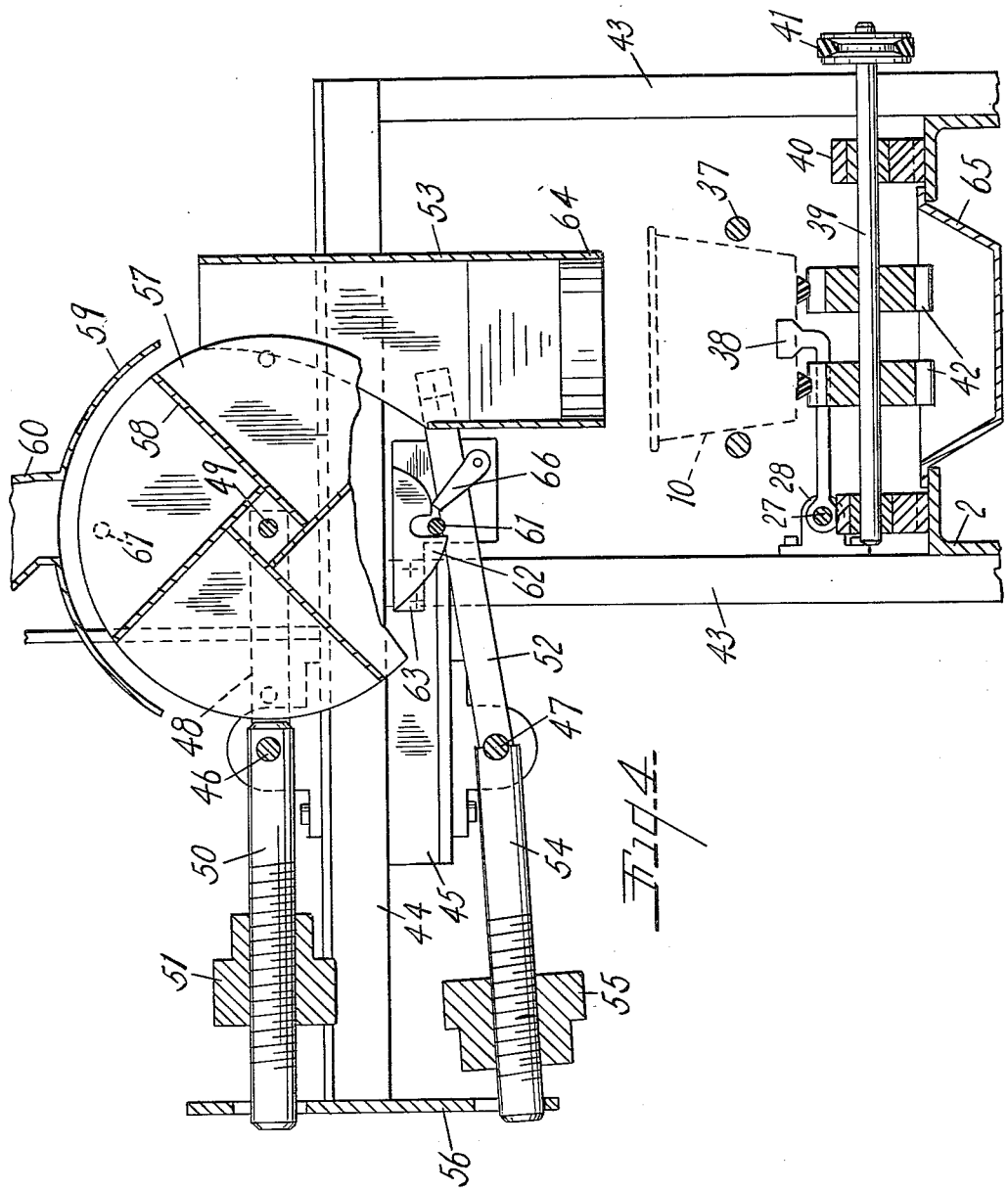

3,099,115
Patented July 30, 1963

3,099,115
MACHINE FOR PACKAGING LOOSE ARTICLES SUCH AS BLUEBERRIES
Horace E. McKibben, Grand Junction, and Paul F. Jones, Dowagiac, Mich., assignors to Blueberry Equipment, Inc., South Haven, Mich.
Filed Jan. 15, 1962, Ser. No. 166,055
25 Claims. (Cl. 53—67)

This invention relates to improvements in machine for packaging loose articles such as blueberries. The principal objects of this invention are:

First, to provide a machine which will effectively pack a measured volume of loose articles in a heap measure in an open topped container and apply a transparent cover film snugly over the heap measure and secure it to the rim of the container.

Second, to provide a machine for packing blueberries which will consecutively deliver an open topped cup-like container to a conveyor, fill the container with a measured charge to form a heaped measure of vibratorily compacted berries in the container, advance the filled container and position a material of heat shrinkable film thereto and thereafter shrink the cover film snugly over the heaped measure and around the bead projected at the top of the container, the several steps being timed in response to the formation of a weight measured charge sufficient to create the heaped measure in the container and deliver the charge to the container.

Third, to provide a container feeding mechanism for a machine for packing blueberries or other articles which will advance and release cup-like cylindrical containers with a bead around the top into the path of a continuously operating knock-off member to assure separation of a single container from the bottom of a stack of nested containers.

Fourth, to provide a charge measuring and delivering mechanism for a machine for packing blueberries or other articles in which a weight balanced rotatable hopper progressively accumulates a measured charge determined by weight and then delivers the charge to a second pivotally supported feed hopper that descends under the weight of the charge into the upper end of an empty container to retain an initially excess volume of the charge over the container until the articles are vibrated and compacted to form a heaped measure in the container, the second hopper retracting when relieved of the weight of the charge to clear the container and the heaped measure of articles therein.

Fifth, to provide mechanism for capping an open topped container with a film of wrapping material in which a length of the cover film material is fed simultaneously with the container under a thick deformable belt to yieldably retain the film over a heaped measure of articles in the container and advance the container and film between other air jets to shrink the projecting edges of the film around a bead on the rim of the container and to further subject the top of the film to further heat to shrink the film snugly into contact with the heaped measure.

Other objects and advantages of the invention will be apparent from a consideration of the following description and claims. The drawings, of which there are four sheets, illustrate a highly practical form of the packing machine of the invention arranged specifically for packing fresh blueberries in pint size paper cup containers.

FIG. 4 is a fragmentary transverse vertical cross sectional view taken generally along the plane of the line 4—4 in FIG. 1 and showing the weight balanced charge forming and delivery mechanism of the machine.

FIG. 6 is a fragmentary top plan view of the film feeding mechanism.

FIG. 7 is a fragmentary transverse vertical cross sectional view taken along the plane of the line 7—7 in FIG. 1 showing the shrinking and sealing action of the cover film being applied to a container.

FIG. 8 is a schematic electrical wiring diagram of the electrical controls on the machine.

Figure 1:
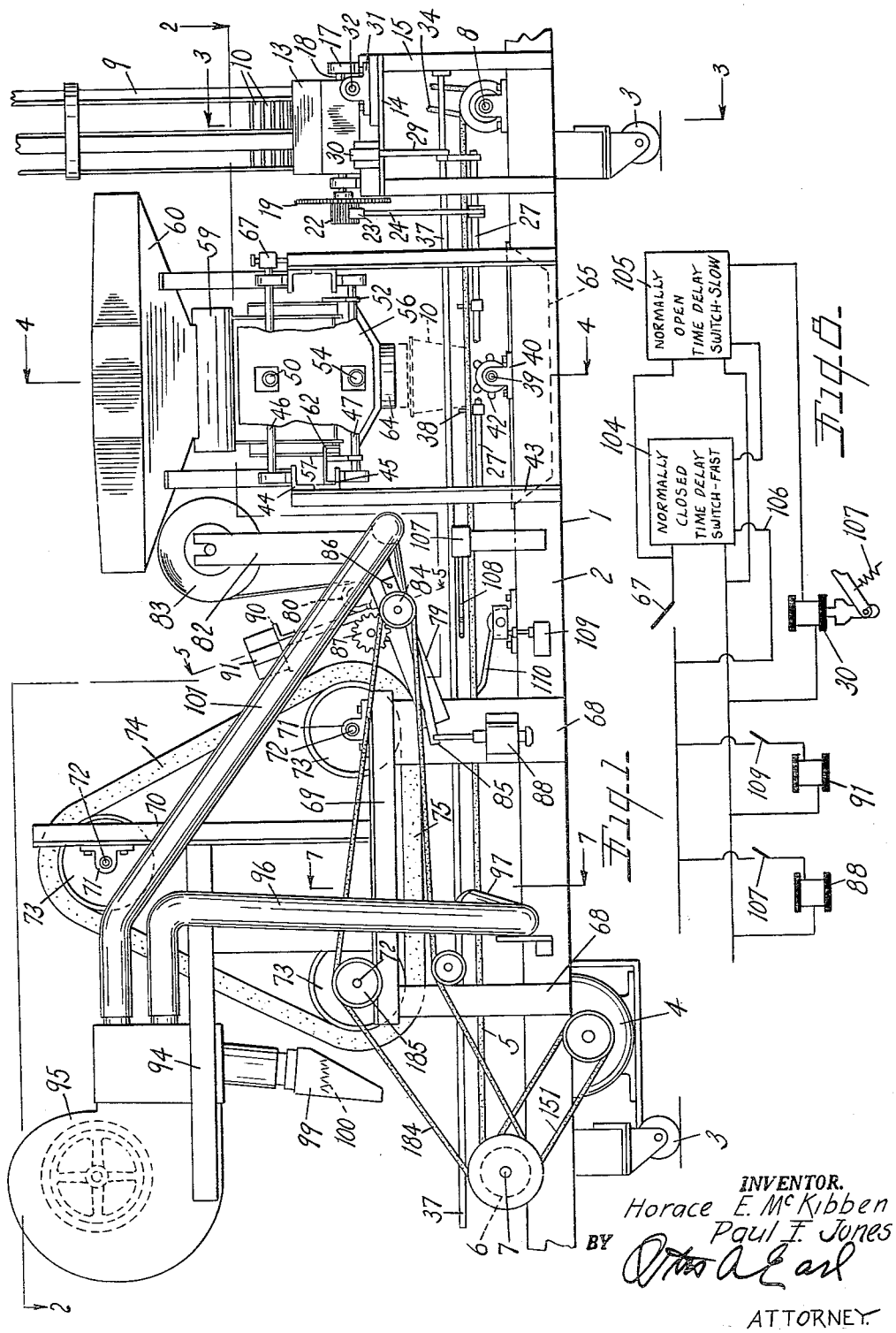
FIG. 1 is a fragmentary side elevational view of the packing machine with parts broken away to illustrate structure toward the back side of the machine.
Figure 2:
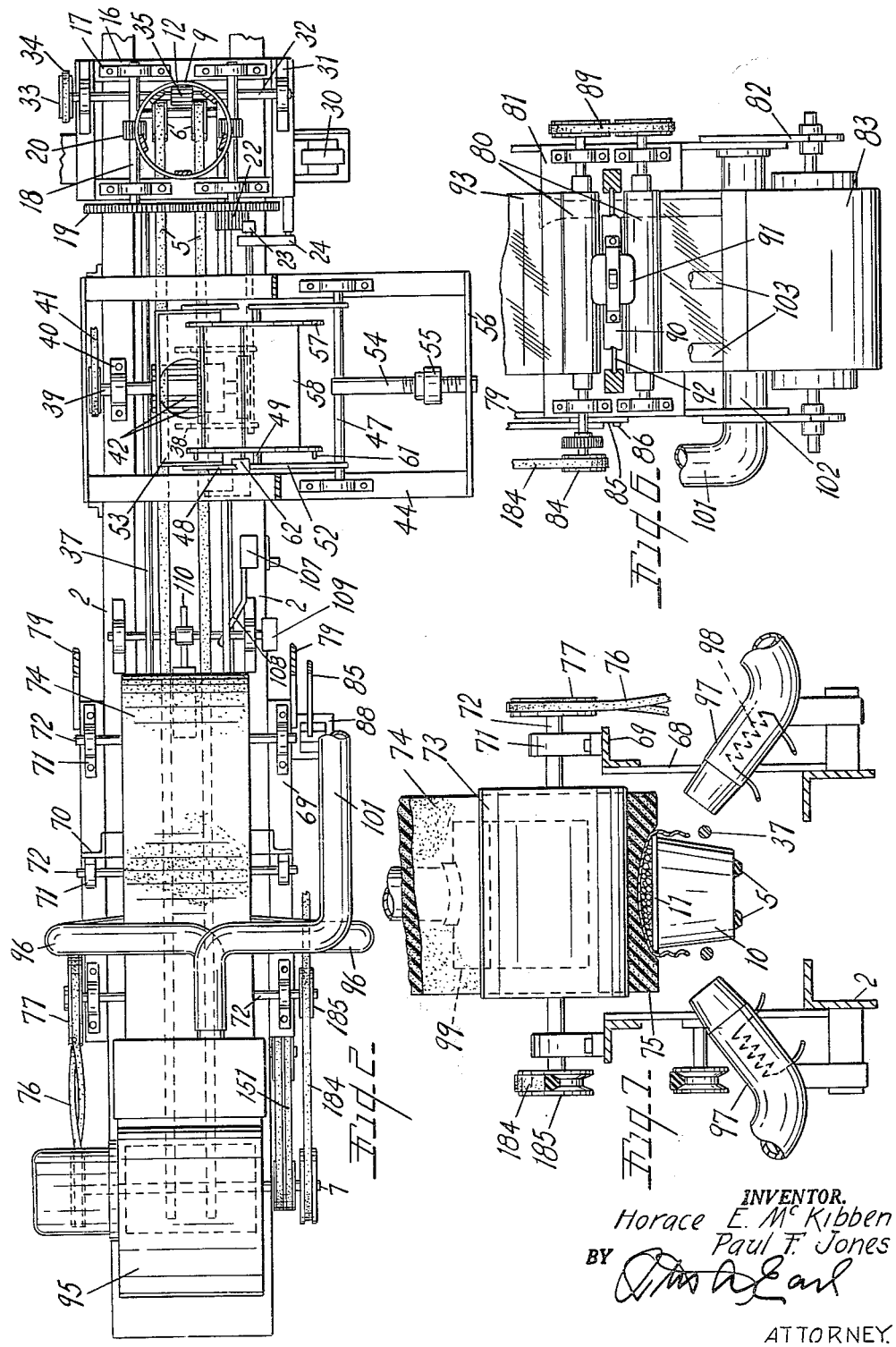
FIG. 2 is a fragmentary horizontal cross sectional view taken along the planes of the broken line 2—2 in FIG. 1, the view eliminating the cover film feed apparatus and blueberry feed chute to illustrate the subadjacent parts generally in plan view.

The machine of the invention is designed primarily for rapidly and inexpensively packaging fresh blueberries in pint containers with minimum damage to the fragile berries and providing a snugly fitting transparent cover over a heaped measure of the fresh fruit in the containers. Obviously other small fruits or small inedible articles could be similarly packed by the machine, but for the purpose of description the machine will be referred to as a packer. The various parts of the machine are assembled and mounted upon a horizontal bottom frame 1 having longitudinal side members 2. The frame may be mounted on caster wheels 3 if desired for movement around a packing plant. An electric motor 4 is mounted on a platform suspended below the side rails 2 for powering the several sections of the machine as will be described.

The machine consists first of a container advancing way consisting of parallel horizontal belt loops 5—5 trained over pulleys 6 on cross shafts 7 and 8 supported in suitable bearings on the side frame members 2. For the purpose of description the shaft 8 will be considered as located at the front of the machine with the upper reaches of the belt loops 5 moving toward the rear shaft 7 to progressively advance containers from front to rear of the machine. The rear shaft 7 is driven by belts 5 directly from the motor 4 and is continuously operated while the machine is in operation.

The first mechanism associated with the container feed way and the belts 5 is an upright storage hopper 9 for a stack of cup shaped open topped paper containers 10 having beads 11 around their rims. The hopper 9 and containers may be of any size or shape, but as stated the example illustrated shows containers having a dry volume of one pint as a commonly marketed package for blueberries. The hopper 9 is supported at its lower end by a band 12 resting on a transverse bridge plate 13 supported on the side members 14 of a platform carried by the upright posts 15 above the conveyor belts 5. The ends of the side members 14 support cross pieces 16 at the front and rear of the hopper carrying bearings 17 which support the longitudinally extending spaced parallel container feed shafts 18. The shafts 18 are interconnected and driven in downwardly converging direction by meshing gears 19 and under the bridge 13 and on opposite sides of the hopper 9. The shafts carry star wheels 20 having teeth or projections 21 spaced to mesh between the adjacent beads of containers stacked in the hopper.

Figure 3:
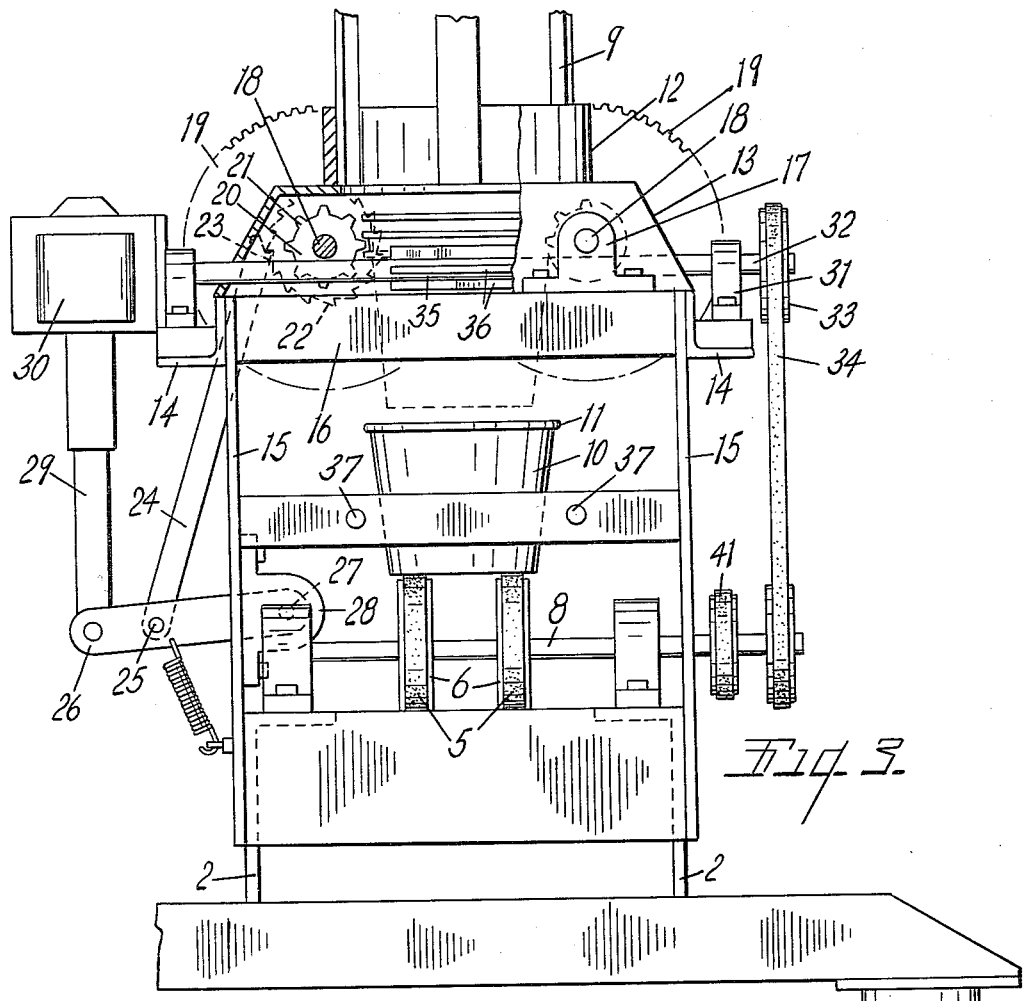
FIG. 3 is a fragmentary transverse vertical cross sectional view taken generally along the plane of the line 3—3 in FIG. 1 and illustrating the container feed mechanism of the machine.

One of the gears 19 carries a ratchet wheel 22 on its rear end which is yieldably engaged by the pawl 23 on a push rod 24 (see FIG. 3). The push rod 24 is pivoted at 25 on a lever 26. The lever is connected at its inner end to a longitudinally extending control shaft 27 mounted in bearings 28 on the upright 15 and at its outer end the lever 26 is connected to the reciprocable core 29 of a solenoid 30. The solenoid is mounted on a suitable bracket on the side bar 14 and the electrical control system for actuating the solenoid will be described presently. For the present it is sufficient to note that energization of the solenoid will lift the armature 29, lever 26 and push rod 24 so that the pawl 23 advances the projections 21 on the star wheels one step to release the bead of the lowermost container in the hopper.

Since the containers 10 are frequently and desirably nested together in order to conserve space, the side frame members 14 are provided with bearings 31 supporting a transverse knock-off shaft 32 having a pulley 33 on its right end. The pulley 33 is connected by a belt 34 with a pulley on the continuously driven shaft 8 so that as soon as the lowermost container in the hopper is lowered by the star wheels 21, its side is engaged by the rotating knock-off member 35 having ribs or projections 36 which frictionally engage the side of the bottom container and release it from the stack so that it falls in upright position on the continuously advancing belts 5. Side rails 37 retain the container laterally on the belts.

Containers delivered onto the belts 5 are advanced thereby to a stop 38 rockably carried by the previously mentioned control shaft 27 to project above the belts 5 at a loading station. Immediately underneath the loading station is a transverse shaft 39 supported by bearings 40 and having a belt 41 connecting it to the front drive shaft 8. The shaft 39 has a series of radial projections 42 in its center which bump against the bottom of the belts 5 particularly when the belts are depressed by the weight of articles in the container to thereby vibrate the container and the articles and compact the articles in the container. When blueberries are being packed, this vibration is relatively weak so as not to damage the fruit by excess compaction.

Blueberries are delivered into the empty container 10 at the loading station by means of charge forming means supported upon uprights 43 projecting upwardly above the side frame members 2. Angle shaped cross bars 44 and 45 support an upper pivot shaft 46 and a lower pivot shtft 47 respectively toward one side of the uprights. The upper pivot shaft 46 supports an inwardly projecting yoke 48 carrying the drum shaft 49 while a balance beam 50 projecting outwardly from the shaft 46 carrying an adjustable counterweight 51. The lower shaft 47 has an inwardly projecting yoke 52 supporting a charge receiving hopper 53 over the loading station. While an outwardly projecting balance beam 54 adjustably supports a second balance weight 55. The balance beams 50 and 54 are limited in their movement by engagement in holes formed in the plate 56 on the ends of the cross bars 44.

The shaft 49 rotatably supports a charge forming drum having circular end plates 57 and radially extending pocket forming plates 58. The drum is positioned underneath a shemi-cylindrical hood 59 having a delivery chute 60 opening to the upwardly facing pockets in the drum so that blueberries or other articles being packaged are introduced through the chute as, for instance, from a sorting belt not illustrated. One end plate of the drum carries a series of axially projecting pins 61 which in the elevated position of the drum on the balance beam 50 are engaged behind the stop 62 in a bracket 63 mounted on the cross bar 45. The drum is thus prevented from rotating until the upper pocket has accumulated a charge as determined by the adjustment of the counter weight 51. In practice this counter weight is adjusted to form a charge which will fill one of the containers 10 to a heaped or rounded measure.

When the presently determined measure or charge is accumulated in the upper pocket of the drum, the beam 50 will overbalance downwardly clearing the lower pin 61 from the stop 62 and permitting the drum to rotate in a clockwise direction as viewed in FIG. 4. The accumulated charge is emptied into the charge receiving hopper or funnel 53 and while the bottom of the funnel is continuously open the counter-balance 55 which counter balances the funnel is adjusted so that the funnel is depressed by the weight and impact of the charge of berries to temporarily depress the neck 64 into the top of an empty container positioned against the stop 38. The charge of blueberries falling loosely through the hopper 53 would tend to overflow the container but the action of the vibrator 42 on the container compacts the charge until substantially the entire charge is heaped into the container. As the weight of the charge is relieved from the hopper 53, the neck 64 is retracted upwardly by the balance beam 52 to clear the filled carton. Some berries may spill over the container but are collected in a catch pan 65 for reintroduction into the delivery chute 60 at intervals. In this way a fully rounded measure of blueberries or articles is assured in each container.

Movement of the charge forming drum is restricted by means of the spring pressed catch 66 pivoted on the bracket 63 in the path of the projecting pins 61. The downwardly moving pin 61 is yieldably engaged by the catch 66 to cushion the discharging motion of the drum and after the pin passes the catch it is prevented from bouncing back from the stop 62 by the catch. This assures that the pocket at the top of the drum will be properly centered under the chute 60.

As the balance beam descends under the weight of a measured charge it momentarily actuates an electric switch 67 which acts through a control system to be described presently to energize the solenoid 30 and oscillate the rock shaft 27 to retract the stop 38 so that the filled container is permitted to travel rearwardly along the belts 5 at the same time that an empty container is introduced onto the front end of the belts by the carton delivering wheels 20. The released carton is moved rearwardly to a capping or covering apparatus supported on the uprights 68. The uprights support elevated side rails 69 and columns 70 supporting bearings 71 for three cross shafts 72. The shafts 72 carry relatively large diameter rollers 73 around which a relatively thick belt 74 is trained. The belt 74 is made of yieldably soft material such as sponge rubber and its lower reach 75 is positioned parallel to the conveyor belts 5 at about the level of the tops of the containers 10 so that in passing below the reach 75 the containers compress the heaped measure of blueberries partially into the deformable surface of the belt. A belt 76 from the drive shaft 7 is trained over a pulley 77 on one of the shafts 72 to rotate the deformable belt at the same speed and in the same direction as the conveyor belts 5 so there is no displacing action on the heaped measure of berries in the container and the measure of berries is gently firmed into the container.

The forward uprights 68 support forwardly projecting inclined arms 79 which support a pair of feed rollers 80 and a pressure plate 81 well above the containers which are translated therebelow. Uprights 82 support a supply roller 83 of a continuous film of covering material such as stretched polystyrene. Stretched polystyrene film has the property of being shrinkable when heated and this heat shrinkable property is utilized as will be described. The feed rolls 80 when driven function to advance the end of the web of covering material downwardly and rearwardly toward the lower reach 75 of the deformable belt. The rolls 80 are operated intermittently by means of a drive gear and pulley 84 mounted on the arm 85 and pivoted to the arm 79 at 86. A belt 184 trained over idler 185 drives pulley 84. The arm 85 is moved upwardly to mesh the pulley and gear 84 with a gear 87 on one of the roll shafts 80. A solenoid 88 actuates the arm 85 as will be described. The two feed rolls 80 are connected for simultaneous actuation by a belt 89 (see FIG. 6).

Figure 5:
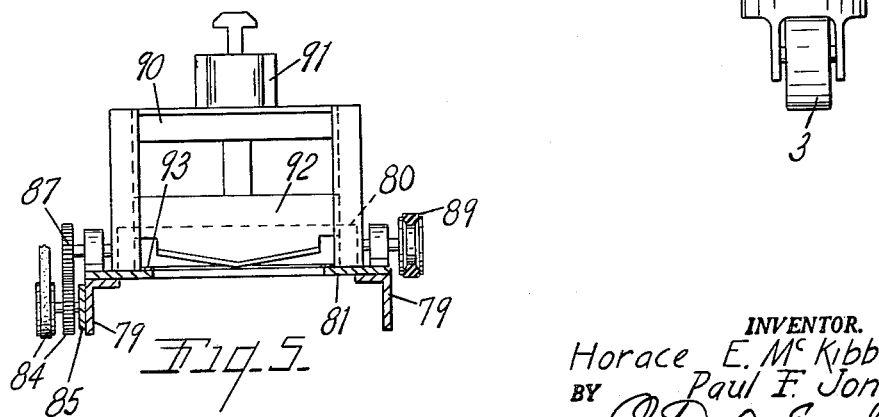
FIG. 5 is a fragmentary transverse cross sectional view through the cover film feeding and severing mechanism taken generally along the plane of the line 5—5 in FIG. 1.

Carried above the feed plate 80 by a suitable bracket 90 is a solenoid 91 supporting and actuating a vertically reciprocable knife 92 which descends through the feed plate 81 to sever the central portion of the web of wrapping material leaving small tabs 93 on each edge of the web as appears most clearly in FIG. 5. The sequence of operation of the knife 92 will be described presently.

The columns 71 which support the rolls 73 for the deformable belt also support rearwardly projecting arms 94 which carry a blower 95. The blower 95 delivers to a pair of side tubes 96 which extend downwardly along both sides of the frame of the machine and terminate in laterally inwardly and upwardly inclined nozzles 97 having heating elements 98 therein as sources of hot air. A downwardly directed nozzle 99 positioned behind the deformable belt 74 has a heating element 100 therein and is designed to deliver a stream of heated air onto the tops of containers emerging from the rear of the deformable belt. A forwardly inclined tube 101 extends to below the wrapper feed table 81 and has a laterally turned end 102 with rearwardly directed nozzles 103 discharging rearwardly along the bottom reach 75 of the deformable belt and below the web of capping or covering film. Air from the nozzles 103 is unheated and performs several functions. First, it supports the free end of the cover web against the deformable belt and secondly it creates a cool air current forming a curtain which prevents hot air from the side nozzles 97 from escaping forwardly. Thirdly, the cool air from the nozzles 103 functions to cool the deformable belt 74 countering the action of the hot air jets thereon.

In the operation of the covering or capping mechanism the filled container with its heaped measure moves rearwardly into contact with the trailing end of the film of cover material and the bottom reach 75 of the deformable belt. The lower reach 75 of the deformable belt deforms over the heaped measure pressing the covering film over the contents and downwardly around the edge of the container. The feed rolls 80 function to advance the web of covering material until a sufficient length of the web is delivered to form a complete overlapping length of the web. The container and the deformable belt 75 move rearwardly at the same speed breaking the edge connecting tabs 93 in the film when the feed rolls 80 stop and the container with an individual cover sheet held thereover is advanced between the side nozzles 97 where the heated air from the nozzles affects the overhanging edges of the cover sheet and causes them to shrink into snug self retaining engagement with the external bead 11 on the container. Note that the side nozzles 97 will direct hot air over all portions of the rim of the container as the container is passed therebetween. As the container with the cover sheet secured thereto emerges from the lower reach 75 of the deformable belt, the rear nozzle 99 directs a jet of heated air on the top of the package to further shrink the covering sheet into snug retaining engagement with the heaped measure of blueberries or other articles in the container.

The operation of the machine is regulated by the timing and actuation of the electrical switches shown conventionally in FIG. 8. As previously indicated the cycle of the machine is initiated by actuation of the switch 67 by the balance beam 50. Closing of the switch 67 functions to simultaneously energize or activate two time delay switch mechanisms 104 and 105. These switches are of the well known type which are cocked or activated by electrical energization and thereafter function to actuate electircal switches at adjustably delayed periods. The switch 104 is relatively fast and functions to first open normally closed contacts in the conductor 106 and reclose the contacts after a relatively short time delay following actuation of the switch.

The switch 105 is relatively slow and functions to first close normally open contacts in the conductor 106 and reopen the contacts after a longer period of delay. The conductor 106 energizes the previously described solenoid 30 to actuate the cup or container feed mechanism and the loading station stop 38 whenever the solenoid is energized. A spring 107 retracts the solenoid and advances or projects stop 38 when the solenoid is de-energized. In the foregoing circuit momentary closing of the balance beam switch 67 conditions the time delay switches to actuate the machine in the desired manner. The contacts of switch 104 are immediately opened and the contacts of switch 105 are immediately closed. After a relatively short time delay during which time the measured charge of berries is delivered through the hopper 53 and vibrated into the container, the switch 104 closes, completing a circuit to the solenoid 30 releasing the filled container and delivering an empty container to the front end of the conveyor belt. Thereafter the relatively slow switch 105 functions to open the circuit in the conductor 106 de-energizing the solenoid 30 and permitting spring retraction of the empty container feed drive arm 24 and repositioning of the container stop 38 at the loading station. During the time delay between the actuation of the two switches 104 and 105 the empty container is advanced from the carton feed to the loading position.

The solenoid 91 which actuates the web cutting knife is controlled by a switch 107 having a feeler arm 108 that is actuated briefly as the filled container approaches the capping station. The previously advanced web of capping film is thus partially severed and ready to form the new cover. The solenoid 88 which regulates the cover film feed is controlled by a switch 109 having a feeler plate or finger 110 positioned rearwardly of the finger 108 and elongated along the conveyor belt 105 to be engaged by a container 10 long enough to feed a length of cover forming web longer than the diameter of the container. This assures adequate overlap of the cover film and positioning of the leading end of the film in position to be engaged by the container as it is delivered by the conveyor belt.

What is claimed as new is:

1. A berry packing machine comprising, a horizontal frame having a first container advancing belt extending therealong, a motor on said frame connected to continuously advance said belt, a hopper positioned over the leading end of said belt to receive a stack of nested cup shaped containers with external beads on their upper ends, means for discharging containers singly onto said belt comprising spaced star wheels positioned on opposite sides of said hopper and having projections engaged with the beads on the lower containers in said stack, ratchet means connected to advance said wheels in a step by step manner, a first solenoid connected to actuate said ratchet means, a knock-off member having projections engageable with the bead of the lowermost container released by the projections on said wheels, said knock-off member being connected to be continuously rotated by said motor, container filling means positioned over said belt behind said hopper comprising a charge receiving hopper pivotally suported on said frame and balanced to descend into a container under the influence of the weight of a charge of berries, a charge measuring drum having charge measuring pockets in its periphery and rotatably supported over said receiving hopper, a balance beam supporting said drum on said frame and having a counter-weight adjustable to be overbalanced by a charge of berries sufficient to fully fill one of said containers, a supply hopper positioned to discharge continually into successive pockets of said drum, a catch engaged with said drum in the raised position of said beam holding said drum against rotation and released in the lowered position of the drum to permit rotation of said drum to discharge a pocket to said receiving hopper when the beam lowers under the influence of the weight of a charge in a pocket, a stop advanceable over said belt to locate a container under said filling means, a vibrator having a continually driven shaft with bumpers there around positioned to strike the belt and vibrate a container engaged with said stop, rock shaft means actuated by said first solenoid connected to retract said container stop and to actuate said means for discharging containers, means including three rollers supporting a belt of thick deformable foam rubber material with a bottom reach thereof spaced parallel over said first belt at about the level of the tops of containers advanced by the first belt, means connected to drive said deformable belt at the same speed and direction as said first belt, a pair of coacting feed rolls positioned over said first belt between said supply hopper and said deformable belt, means including a pivotaly supported and continuously driven gear connectable to said rolls and arranged to feed a film of heat shrinkable polystyrene material toward said bottom reach of said deformable belt at the same speed as said first belt, a second soleniod connected to mechanically engage said gear with said rolls and actuate said film feed means, a supply roll of said film delivering to said feed rolls, a knife arranged to cut a portion only of said film ahead of said feed rolls, a third solenoid connected to actuate said knife, means including a blower delivering to heated and unheated chambers as sources of heated and unheated air, side nozzles directed at the underside of said deformable belt midway along its bottom reach and connected to said source of heated air, a rear nozzle connected to said source of heated air and directed downwardly behind the rear of said deformable belt to impinge hot air on the tops of containers issuing from under the belt, another nozzle connected to said source of unheated air and directed rearwardly under the film delivered from said feed rolls and along the bottom reach of said deformable belt, first control means including a first feeler switch actuated by engagement with a container leaving said container filling means and electrically connected to actuate said third solenoid and said knife, a second control means including a second feeler switch actuated by engagement with a container after passing said first control means and electrically connected to actuate said second solenoid to actuate said film feed means to feed a length of said film greater than the width of a container, a third control means including a balance switch actuated by over-balancing of said balance beam, a first normally closed time delay switch opened by said balance switch, said first solenoid being electricaly connected to said time delay switch to actuate said container discharging means and retract said stop from in front of a container under said receiving hopper, and a second normally open and slower time delay switch closed by said balance switch and electrically connected in series with said first time delay switch.

2. A berry packing machine comprising, a horizontal frame having a first container advancing belt extending therealong, a motor on said frame connected to continuously advance said belt, a hopper positioned over the leading end of said belt to receive a stack of nested cup-shaped containers with external beads on their upper ends, means for discharging containers singly onto said belt, a first solenoid connected to actuate said means, container filling means positioned over said belt behind said hopper comprising a charge receiving hopper pivotally supported on said frame and balanced to descend into a container under the influence of the weight of a charge of berries, a charge measuring drum having charge measuring pockets in its periphery and rotatably supported over said receiving hopper, a balance beam supporting said drum on said frame and having a counter-weight adjustable to be overbalanced by a charge of berries sufficient to fully fill one of said containers, a supply hopper positioned to discharge continually into successive pockets of said drum, said drum having a catch rotatively engageable with a fixed stop on said frame in the elevated position of said drum and disengageable from said stop in the lowered position of the drum to permit rotation of the drum to discharge a pocket to said receiving hopper under the influence of the weight of a charge in a pocket, a stop advanceable over said belt to locate a container under said receiving hopper, a vibrator positioned to vibrate a container engaged with said stop, rock shaft means actuated by said first solenoid connected to retract said container stop and to actuate said means for discharging containers, means supporting a belt of thick deformable material with a bottom reach thereof spaced parallel over said first belt at about the level of the tops of containers advanced by the first belt, means connected to drive said deformable belt at the same speed and direction as said first belt, means to feed a film of heat shrinkable polystyrene material toward said bottom reach of said deformable belt at the same speed as said first belt including a feed roll positioned over said first belt between said receiving hopper and said deformable belt, a second solenoid connected to actuate said film feed means, a supply roll of said film delivering to said feed rolls, a knife arranged to cut a portion only of said film, a third solenoid connected to actuate said knife, side nozzles directed at the underside of said deformable belt along its bottom reach and connected to deliver heated air thereto, a rear nozzle connected to deliver heated air and directed downwardly behind the fear of said deformable belt to impinge hot air on the tops of containers issuing from under the belt, another nozzle connected to deliver unheated air and directed rearwardly under the film delivered from said feed rolls and along the bottom reach of said deformable belt, first control means including a first feeler switch actuated by engagement with a container leaving said container filling means and electrically connected to actuate said third solenoid and said knife, a second control means including a second feeler switch actuated by engagement with a container after passing said first control means and electrically connected to actuate said second solenoid to actuate said film feed means to feed a length of said film greater than the width of a container, and a third control means including a balance switch actuated by over-balancing of said balance beam connected to actuate said container discharging means and retract said stop from in front of a container under said receiving hopper.

3. A berry packing machine comprising, a horizontal frame having a first container advancing belt extending therealong, a motor on said frame connected to continuously advance said belt, a hopper positioned over the leading end of said belt to receive a stack of nested cup-shaped containers with external beads on their upper ends, means for discharging containers singly onto said belt comprising spaced star wheels positioned on opposite sides of said hopper and having projections engaged with the beads on the lower containers in said stack, ratchet means connected to advance said wheels in a step by step manner, a first solenoid connected to actuate said ratchet means, a knock-off member having projections engageable with the lowermost container released by the projections on said wheels, said knock-off member being connected to be continuously rotated by said motor, container filling means positioned over said belt behind said hopper comprising a charge receiving hopper pivotally supported on said frame and balanced to descend into a container under the influence of the weight of a charge of berries, a charge measuring drum having charge measuring pockets in its periphery and rotatably supported over said receiving hopper, a balance beam supporting said drum on said frame and having a counter-weight adjustable to be overbalanced by a charge of berries sufficient to fully fill one of said containers, a supply hopper positioned to discharge continually into successive pockets of said drum, a catch engaged with said drum in the raised position of said beam holding said drum against rotation and released in the lower position of the drum to permit rotation of said drum to discharge a pocket to said receiving hopper when the beam lowers under the influence of the weight of a charge in a pocket, a stop advanceable over said belt to locate a container under said filling means, a vibrator positioned to vibrate a container engaged with said stop, rock shaft means actuated by said first solenoid connected to retract said container stop and to actuate said means for discharging containers, means including three rollers supporting a belt of thick deformable material with a reach thereof spaced parallel over said first belt at about the level of the tops of containers advanced by the first belt, means connected to drive said deformable belt at the same speed and direction as said first belt, a pair of coacting feed rolls positioned over said first belt between said receiving hopper and said deformable belt, means including a continuously driven part connectable to said rolls and arranged to feed a film of heat shrinkable film material toward said bottom reach of said deformable belt, a second solenoid connected to mechanically engage said part of said rolls and actuate said film feed means, a supply roll of said film delivering to said feed rolls, a knife arranged to cut a portion only of said film, a third solenoid connected to actuate said knife, means including a blower delivering to heated and unheated chambers as sources of heated and unheated air, side nozzles directed at the underside of said deformable belt along its bottom reach and connected to a source of heated air, a rear nozzle connected to a source of heated air and directed downwardly behind the rear of said deformable belt to impinge hot air on the tops of containers issuing from under the belt, another nozzle connected to a source of unheated air and directed rearwardly under the film delivered from said feed rolls and along the bottom reach of said deformable belt, first control means including a first feeler switch actuated by engagement with a container leaving said container filling means and electrically connected to actuate said third solenoid and said knife, a second control means including a second feeler switch actuated by engagement with a container after passing said first control means and electrically connected to actuate said second solenoid to actuate said film feed means to feed a length of said film greater than the width of a container, and a third control means including a balance switch actuated by over-balancing of said balance beam, a first normally closed relatively fast time delay switch opened by said balance switch, said first solenoid being electrically connected to said time delay switch to actuate said container discharging means at the end of the time delay and retract said stop from in front of a container under said receiving hopper, and a second normally open relatively slow time delay switch closed simultaneously with opening of said first time delay switch and electrically connected in series therewith to hold said first solenoid in actuated container releasing position for the period of delay between the closing of said normally closed fast time delay switch and opening of said second time delay switch.

4. A berry packing machine comprising, a horizontal frame having a first container advancing belt extending therealong, a motor on said frame connected to continuously advance said belt, a hopper positioned over the leading end of said belt to receive a stack of nested cup-shaped containers with external beads on their upper ends, means for discharging containers singly onto said belt, container filling means positioned over said belt behind said hopper comprising a charge receiving hopper pivotally supported on said frame and balanced to descend into a container under the influence of the weight of a charge of berries, a charge measuring drum having charge measuring pockets in its periphery and rotatably supported over said receiving hopper, a balance beam supporting said drum on said frame and having a counterweight adjustable to be overbalanced by a charge of berries sufficient to fully fill one of said containers, a supply hopper positioned to discharge continually into successive pockets of said drum, a catch engaged with said drum in the raised position of said beam holding said drum against rotation and released in the lower position of the drum to permit rotation of said drum to discharge a pocket to said receiving hopper when the beam lowers under the influence of the weight of a charge in a pocket, a stop advanceable over said belt to locate a container under said filling means, a vibrator positioned to vibrate a container engaged with said stop, rock shaft means connected to retract said container stop and to actuate said means for discharging containers, means including three rollers supporting a belt of thick deformable material with a bottom reach thereof spaced parallel over said first belt at about the level of the tops of containers advanced by the first belt, means connected to drive said deformable belt at the same speed and direction as said first belt, a pair of coacting feed rolls positioned over said first belt between said receiving hopper and said deformable belt, means including a continuously driven part connectable to said rolls and arranged to feed a film of heat shrinkable film material toward said bottom reach of said deformable belt, a solenoid connected to mechanically engage said part to said rolls and actuate said film feed means, a supply roll of said film delivering to said feed rolls, a knife arranged to cut a portion only of said film, a second solenoid connected to actuate said knife, means forming sources of heated and unheated air, side nozzles directed at the underside of said deformable belt along its bottom reach and connected to a source of heated air, another nozzle connected to a source of unheated air and directed rearwardly under the film delivered from said feed rolls and along the bottom reach of said deformable belt, first control means including a first feeler switch actuated by engagement with a container leaving said container filling means and electrically connected to actuate said second solenoid and said knife, a second control means including a second feeler switch actuated by engagement wtih a container and electrically connected to actuate said first solenoid to actuate said film feed means to feed a length of said film greater than the width of a container, and a third control means including a balance switch actuated by over-balancing of said balance beam connected to actuate said container discharging means.

5. A berry packing machine comprising, a horizontal frame having a first container advancing belt extending therealong, a motor on said frame connected to continuously advance said belt, a hopper positioned over the leading end of said belt to receive a stack of nested cup-shaped containers with external beads on their upper ends, means for discharging containers singly onto said belt, container filling means positioned over said belt behind said hopper comprising a charge receiving hopper pivotally supported on said frame and balanced to descend into a container under the influence of the weight of a charge of berries, a charge measuring means supported over said receiving hopper, a balance beam supporting said measuring means on said frame and having a counter-weight adjustable to be overbalanced by a charge of berries sufficient to fully fill one of said containers, a supply hopper positioned to discharge into said measuring means, a stop advanceable over said belt to locate a container under said filling means, a vibrator positioned to vibrate a container engaged with said stop, rock shaft means connected to retract said container stop and to actuate said means for discharging containers, means including three rollers supporting a belt of thick deformable foam rubber material with a bottom reach thereof spaced parallel over said first belt at about the level of the tops of containers advanced by the first belt, means connected to drive said deformable belt at the same speed and direction as said first belt, a pair of coacting feed rolls positioned over said first belt between said receiving hopper and said deformable belt, means arranged to feed a film of heat shrinkable polystyrene material toward said bottom reach of said deformable belt, a solenoid connected to mechanically actuate said film feed means, a supply roll of said film delivering to said feed rolls, a knife arranged to cut a portion only of said film ahead of said feed rolls, a second solenoid connected to actuate said knife, side nozzles directed at the underside of said deformable belt midway along its bottom reach and arranged to deliver heated air, a rear nozzle directed downwardly behind the rear of said deformable belt and arranged to impinge hot air on the tops of containers issuing from under the belt, another nozzle directed rearwardly under the film delivered from said feed rolls and along the bottom reach of said deformable belt and arranged to deliver unheated air, first control means including a first feeler switch actuated by engagement with a container leaving said container filling means and electrically connected to actuate said second solenoid and said knife, a second control means including a second feeler switch actuated by engagement with a container after passing said first control means and electrically connected to actuate said first solenoid to actuate said film feed means to feed a length of said film greater than the width of a container, and a third control means including a balance switch actuated by over-balancing of said balance beam, connected to actuate said container discharging means and retract said stop from in front of a container under said receiving hopper.

6. A berry packing machine comprising a horizontal frame having a first container advancing belt extending therealong, a motor on said frame connected to continuously advance said belt, a hopper positioned over the leading end of said belt to receive a stack of nested cup-shaped containers with external beads on their upper ends, means for discharging containers singly onto said belt, container filling means positioned over said belt behind said hopper comprising a charge receiving hopper pivotally supported on said frame and balanced to descend into a container under the influence of the weight of a charge of berries, a charge measuring means supported over said receiving hopper, a balance beam supporting said measuring means on said frame and having a counter-weight adjustable to be overbalanced by a charge of berries sufficient to fully fill one of said containers, a supply hopper positioned to discharge into said measuring means, a stop advanceable over said belt to locate a container under said filling means, rock shaft means connected to retract said container stop and to actuate said means for discharging containers, means including three rollers supporting a belt of thick deformable material with a bottom reach thereof spaced parallel over said first belt at about the level of the tops of containers advanced by the first belt, means connected to drive said deformable belt at the same speed and direction as said first belt, a pair of coacting feed rolls positioned over said first belt between said reeciving hopper and said deformable belt, means arranged to feed a film of heat shrinkable material toward said bottom reach of said deformable belt,
a solenoid connected to actuate said film feed means,
a supply roll of said film delivering to said feed rolls,
a knife arranged to cut a portion only of said film ahead of said feed rolls,
a second solenoid connected to actuate said knife,
side nozzles directed at the underside of said deformable belt along its bottom reach and arranged to deliver heated air,
another nozzle directed rearwardly under the film delivered from said feed rolls and along the bottom reach of said deformable belt and arranged to deliver unheated air,
first control means including a first feeler switch actuated by engagement with a container leaving said container filling means and electrically connected to actuate said second solenoid and said knife,
a second control means including a second feeler switch actuated by engagement with a container and electrically connected to actuate said first solenoid to actuate said film feed means to feed a length of said film greater than the width of a container,
and a third control means including a balance switch actuated by over-balancing of said balance beam connected to actuate said container discharging means and retract said stop from in front of a container under said receiving hopper.

7. A berry packing machine comprising,
a horizontal frame having a container advancing way extending therealong,
a motor on said frame connected to advance containers along said way,
means for delivering containers singly onto said way with a heaped measure of berries in the containers,
means including three rollers supporting a belt of thick deformable foam material with a bottom reach thereof spaced parallel over said way at about the level of the tops of containers advanced along the way,
means connected to drive said deformable belt at the same speed and direction as said containers moving on said way,
means arranged to feed a film of heat shrinkable material toward said bottom reach of said deformable belt at the same speed as containers advanced along said way,
a solenoid connected to actuate said film feed means,
a supply roll of said film delivering to said means arranged to feed film,
a knife arranged to cut a portion only of said film,
a second solenoid connected to actuate said knife,
side nozzles directed at the underside of said deformable belt midway along its bottom reach and connected to deliver heated air,
a rear nozzle directed downwardly behind the rear of said deformable belt to impinge hot air on the tops of containers issuing from under the belt,
another nozzle directed rearwardly under the film and along the bottom reach of said deformable belt and arranged to deliver unheated air,
first control means including a first feeler switch actuated by engagement with a container and electrically connected to actuate said second solenoid and said knife,
and a second control means including a second feeler switch actuated by engagement with a container electrically connected to actuate said first solenoid to actuate said film feed means to feed a length of said film greater than the width of a container.

8. A berry packing machine comprising,
a horizontal frame having a container advancing way extending therealong,
a motor on said frame connected to advance containers along said way,
means for delivering containers singly onto said way with a heaped measure of berries in the containers,
means including three rollers supporting a belt of thick deformable foam material with a bottom reach thereof spaced parallel over said way at about the level of the tops of containers advanced along the way,
means connected to drive said deformable belt at the same speed and direction as said containers moving on said way,
means arranged to feed a film of heat shrinkable material toward said bottom reach of said deformable belt at the same speed as said belt,
a supply roll of said film delivering to said means arranged to feed film,
a knife arranged to cut a portion only of said film,
side nozzles directed at the underside of said deformable belt midway along its bottom reach and connected to deliver heated air,
a rear nozzle directed downwardly behind the rear of said deformable belt to impinge hot air on the tops of containers issuing from under the belt,
another nozzle directed rearwardly under the film and along the bottom reach of said deformable belt and arranged to deliver unheated air,
first control means connected to actuate said knife,
and a second control means connected to actuate said film feed means to feed a length of said film greater than the width of a container.

9. A packaging machine for small articles comprising,
a horizontal frame having a first container advancing belt extending therealong,
a motor on said frame connected to continuously advance said belt,
a hopper positioned over the leading end of said belt to receive a stack of nested cup-shaped containers with external beads on their upper ends,
means for discharging containers singly onto said belt,
a first solenoid connected to actuate said means,
container filling means positioned over said belt behind said hopper comprising a charge receiving hopper pivotally supported on said frame and balanced to descend into a container under the influence of the weight of a heaped measure of the articles,
a charge measuring means arranged to discharge into said receiving hopper,
a balance beam supporting said measuring means on said frame and having a counter-weight adjustable to be overbalanced by a charge of articles sufficient to form a heaped measure for one of said containers,
a stop advanceable over said belt to locate a container under said filling means,
a vibrator positioned to vibrate a container engaged with said stop,
rock shaft means actuated by said first solenoid connected to retract said container stop and to actuate said means for discharging containers,
means supporting a belt of thick deformable material with a bottom reach thereof spaced parallel over said first belt at about the level of the tops of containers advanced by the first belt,
means connected to drive said deformable belt at the same speed and direction as said first belt,
means to feed a film of heat shrinkable material toward said bottom reach of said deformable belt at the same speed as said first belt,
a second solenoid connected to actuate said film feed means,
a supply roll of said film delivering to said means arranged to feed film,
a knife arranged to cut a portion only of said film,
a third solenoid connected to actuate said knife,
side nozzles directed at the underside of said deformable belt along its bottom reach and arranged to deliver heated air against the edges of said film on said containers, a rear nozzle arranged to deliver heated air directed downwardly behind the rear of said deformable belt to impinge on the tops of containers issuing from under the belt, another nozzle arranged to deliver unheated air rearwardly under the film and along the bottom reach of said deformable belt, first control means including a first feeler switch actuated by engagement with a container leaving said container filling means and electrically connected to actuate said third solenoid and said knife, a second control means including a second feeler switch actuated by engagement with a container after passing said filling means and electrically connected to actuate said second solenoid to actuate said film feed means to feed a length of said film greater than the width of a container, and a third control means actuated by said filling means connected to actuate said first solenoid to actuate said container discharging means and retract said stop from in front of a container under said receiving hopper.

10. A packing machine for small articles comprising, a horizontal frame having a container advancing belt extending therealong, a motor on said frame connected to continuously advance said belt, a hopper positioned over the leading end of said belt to receive a stack of nested cup-shaped containers with external beads on their upper ends, means for discharging containers singly onto said belt, a first solenoid connected to actuate said means, container filling means positioned over said belt behind said hopper comprising a charge receiving hopper pivotally supported on said frame and balanced to descend into a container under the influence of the weight of a heaped measure of the articles, a charge measuring means arranged to discharge into said receiving hopper, a balance beam supporting said measuring means on said frame and having a counterweight adjustable to be overbalanced by a charge of articles sufficient to form a heaped measure for one of said containers, a stop advanceable over said belt to locate a container under said filling means, rock shaft means actuated by said first solenoid connected to retract said container stop and to actuate said means for discharging containers, means supporting a belt of thick deformable material with a bottom reach thereof spaced parallel over said first belt at about the level of the tops of containers advanced by the first belt, means connected to drive said deformable belt at the the same speed and direction as said first belt, means to feed a film of heat shrinkable material toward said bottom reach of said deformable belt at the same speed as said first belt, a second solenoid connected to actuate said film feed means, a supply roll of said film delivering to said feed rolls, a knife arranged to cut a portion only of said film, a third solenoid connected to actuate said knife, side nozzles directed at the underside of said deformable belt along its bottom reach and arranged to deliver heated air against the edges of said film on said containers, first control means including a first feeder switch actuated by engagement with a container leaving said container filling means and electrically connected to actuate said third solenoid and said knife, a second control means including a second feeler switch actuated by engagement with a container after passing said filling means and electrically connected to actuate said second solenoid to actuate said film feed means to feed a length of said film greater than the width of a container, and a third control means actuated by said filling means connected to actuate said first solenoid to actuate said container discharging means and retract said stop from in front of a container under said receiving hopper.

11. A packing machine for small articles comprising, a horizontal way having a container advancing means extending therealong, a hopper positioned over the leading end of said way to receive a stack of nested cup shaped containers with external beads on their upper ends, means for discharging containers from said hopper singly onto said way, a first solenoid connected to actuate said discharging means, container filling means positioned over said way behind said hopper, means arranged to locate a container under said filling means, a vibrator positioned to vibrate a container located under said filling means, means supporting a belt of thick deformable material with a bottom reach thereof spaced parallel over said way at about the level of the tops of containers advanced from said filling means, means connected to drive said deformable belt at the same speed and direction as said containers, means to feed a film of heat shrinkable material toward said bottom reach of said deformable belt at the same speed as said containers, said nozzles directed at the underside of said deformable belt along its bottom reach and connected to deliver jets of heated air, a rear nozzle connected to impinge hot air on the tops of containers issuing from under the belt, another nozzle connected to deliver unheated air and directed rearwardly under the film delivered along the bottom reach of said deformable belt, and control means actuated in response to actuation of said container filling means connected to actuate said container advancing means.

12. A packing machine for small articles comprising, a horizontal way having a container advancing means extending therealong, a hopper positioned over the leading end of said way to receive a stack of nested cup-shaped containers with external beads on their upper ends, means for discharging containers from said hopper singly onto said way, a first solenoid connected to actuate said discharging means, container filling means positioned over said way behind said hopper, means arranged to locate a container under said filling means, a vibrator positioned to vibrate a container located under said filling means, means supporting a belt of thick deformable material with a bottom reach thereof spaced parallel over said way at about the level of the tops of containers advanced from said filling means, means connected to drive said deformable belt at the same speed and direction as said containers, means to feed a film of heat shrinkable material toward said bottom reach of said deformable belt at the same speed as said containers, side nozzles directed at the underside of said deformable belt along its bottom reach and connected to deliver jets of heated air, another nozzle connected to deliver unheated air and directed rearwardly under the film delivered along the bottom reach of said deformable belt, and control means actuated in response to actuation of said container filling means connected to actuate said container advancing means.

13. A machine for packing loose articles such as berries in an open topped container to a heaped measure above the top of the container comprising,
a continuously operative conveyor,
container feed means positioned to introduce an empty container onto said conveyor,
a stop removably positioned across said conveyor to stop a container at a filling station,
means for simultaneously actuating said container feed means and for retracting said stop,
vibrator means engageable with a container located on said conveyor at said filling station,
an article guide hopper pivotally supported and adjustably balanced over said conveyor at said filling station and having a cylindrical discharge neck lowerable into a container under the influence of the weight of a heaped measure of articles being introduced into a container,
a second hopper supported on an adjustable balance beam to receive articles from a source and discharge into said guide hopper when the beam is overbalanced,
and control means actuated by overbalancing said beam and operating through a time delay mechanism to actuate said means for actuating said container feed means and for retracting said stop.

14. A machine for packing loose articles such as berries in an open topped container to a heaped measure above the top of the container comprising,
a continuously operative conveyor,
container feed means positioned to introduce an empty container onto said conveyor,
a stop removably positioned across said conveyor to stop a container at a filling station,
means for actuating said container feed means and for retracting said stop,
an article guide hopper pivotally supported and adjustably balanced over said conveyor at said filling station and lowerable into filling relation to a container under the influence of the weight of a measure of articles being introduced into a container,
a second hopper supported on an adjustable balance beam to receive articles from a source and discharge into said guide hopper when the beam is overbalanced,
and control means actuated by overbalancing said beam and operating through a time delay mechanism to actuate said means for actuating said container feed means and for retracting said stop.

15. A machine for packing loose articles such as berries in an open topped container to a heaped measure above the top of the container comprising,
a continuously operative conveyor,
container feed means positioned to introduce an empty container onto said conveyor,
a stop removably positioned across said conveyor to stop a container at a filling station,
means for actuating said container feed means and for retracting said stop,
vibrator means engageable with a container located on said conveyor at said filling station,
an article guide hopper pivotally supported and adjustably balanced over said conveyor at said filling station and having a discharge neck lowerable into a container under the influence of the weight of a heaped measure of articles being introduced into a container,
a second hopper supported on a balance beam to receive articles from a source and discharge into said guide hopper when the beam is overbalanced,
and control means actuated by overbalancing said beam to actuate said means for actuating said container feed means and for retracting said stop.

16. A machine for packing loose articles such as berries in an open topped container to a heaped measure above the top of the container comprising,
means supporting a container at a filling station,
vibrator means engageable with a container located at said filling station,
an article guide hopper pivotally supported and adjustably balanced at said filling station and having a discharge neck lowerable into a container under the influence of the weight of a measure of articles being introduced into a container with an upper hopper portion having a volume approximately equal to the volume of the container projecting above the container,
and measuring means arranged to receive a measure of articles sufficient to form a heaped measure in said container from a source and discharge into said guide hopper.

17. Container feed means for singly feeding open topped containers having an external bead comprising,
an upright hopper arranged to receive a stack of said containers in nested position,
a pair of star wheels mounted on horizontal axes on opposite sides of said hopper at the bottom of the hopper and having projecting teeth spaced to enter between the beads of successive containers and support the lowermost container in the stack,
a continuously driven knock-off member rotatably positioned below said hopper and having a downwardly moving side with projections thereon frictionally engageable with the side of a container on the bottom of said stack below said teeth,
and ratchet means connected to advance said star wheels in a step by step manner to successively lower containers into contact with said knock-off members.

18. Container feed means for singly feeding open topped containers having an external bead comprising,
an upright hopper arranged to receive a stack of said containers in nested position,
a star wheel mounted on a horizontal axis at the bottom of the hopper and having projecting teeth spaced to enter between the beads of successive containers and support the lowermost container in the stack,
a knock-off member rotatably positioned below said hopper and having a downwardly moving side frictionally engageable with the side of a container on the bottom of said stack below said teeth,
and means connected to advance said star wheel to successively lower containers into contact with said knock-off members.

19. A packing machine for loose articles comprising,
container filling means arranged to introduce a heaping measure of articles into an open topped container with an external bead around its upper end,
means for translating said container from said filling means through a covering station,
means supporting a belt of thick deformable material with a bottom reach thereof spaced parallel over said covering station at about the level of the tops of containers advanced therethrough,
means connected to drive said deformable belt at the same speed and direction as said container translating means,
means to feed a film of heat shrinkable material toward said bottom reach of said deformable belt including a pair of contacting feed rolls positioned between said container filling means and said deformable belt,
a supply roll of said film delivering to said feed rolls,
a knife arranged to cut a portion only of said film,
side nozzles directed at the underside of said deformable belt along its bottom reach and connected to deliver heated air thereto,
a rear nozzle connected to deliver heated air and directed downwardly behind the rear of said deformable belt to impinge hot air on the top of containers issuing from under the belt,
and another nozzle connected to deliver unheated air and directed rearwardly under the said film and along the bottom reach of said deformable belt.

20. A packing machine for loose articles comprising, container filling means arranged to introduce a heaping measure of articles into an open topped container,
means for translating said container from said filling means through a covering station,
means supporting a belt of deformable material with a bottom reach thereof spaced parallel over said covering station at about the level of the tops of containers advanced therethrough,
means connected to drive said deformable belt at the same speed and direction as said container translating means,
means to feed a film of heat shrinkable material toward said bottom reach of said deformable belt,
side nozzles directed at the underside of said deformable belt along its bottom reach and connected to deliver heated air thereto,
a rear nozzle connected to deliver heated air and directed downwardly behind the rear of said deformable belt to impinge hot air on the tops of containers issuing from under the belt,
and another nozzle connected to deliver unheated air and directed rearwardly under the said film and along the bottom reach of said deformable belt.

21. A packing machine for loose articles comprising, container filling means arranged to introduce a heaping measure of articles into an open topped container,
means for translating said container from said filling means through a covering station,
means supporting a deformable belt with a bottom reach thereof spaced over said covering station at about the level of the tops of containers advanced therethrough,
means connected to drive said deformable belt at the same speed and direction as said container translating means,
means to feed a film of heat shrinkable material toward said bottom reach of said deformable belt at the same speed as said containers including a feed roll positioned between said container filling means and said deformable belt,
a supply roll of said film delivering to said feed roll,
a knife arranged to cut said film,
side nozzles directed at the underside of said deformable belt along its bottom reach and connected to deliver heated air thereto,
and a rear nozzle connected to deliver heated air and directed downwardly behind the rear of said deformable belt to impinge hot air on the tops of containers issuing from under the belt.

22. A packing machine for loose articles comprising, container filling means arranged to introduce a heaping measure of articles into an open topped container,
means for translating said container from said filling means through a covering station,
means supporting a deformable belt with a bottom reach thereof spaced over said covering station at about the level of the tops of containers advanced therethrough,
means connected to drive said deformable belt at the same speed and direction as said container translating means,
means to feed a film of heat shrinkable material toward said bottom reach of said deformable belt,
and side nozzles directed at the underside of said deformable belt along its bottom reach and connected to deliver heated air thereto, said belt being deformable perpendicular to its thickness completely across its area of contact with said containers and uniformly resilient throughout said area to yield variably throughout the area to varying pressure thereacross.

23. A packing machine for loose articles comprising, a horizontal frame having a container advancing belt extending therealong,
a motor on said frame connected to continuously advance said belt,
a hopper positioned over the leading end of said belt to receive a stack of nested cup shaped containers,
means for discharging containers singly from said hopper onto said belt,
a first solenoid connected to actuate said container discharging means,
container filling means positioned over said belt behind said hopper comprising a charge receiving hopper pivotally supported on said frame and balanced to descend into a container under the influence of the weight of a charge of articles,
a charge measuring element supported over said receiving hopper,
a balance beam supporting said element on said frame and having a counterweight adjustable to be overbalanced by a charge of articles sufficient to fully fill one of said containers,
a source of articles positioned to discharge continually into said measuring element,
a stop advanceable over said belt to locate a container under said receiving hopper,
a vibrator positioned to vibrate a container engaged with said stop,
rock shaft means actuated by said first solenoid connected to retract said container stop and to actuate said means for discharging containers,
and control means including a balance switch actuated by over-balancing of said balance beam connected through a time delay mechanism to actuate said container discharging means and retract said stop from in front of a container under said receiving hopper.

24. A packing machine for loose articles comprising, a horizontal frame having a container advancing belt extending therealong,
a motor on said frame connected to continuously advance said belt,
a hopper positioned over the leading end of said belt to receive a stack of nested cup shaped containers,
means for discharging containers singly from said hopper onto said belt,
a first solenoid connected to actuate said container discharging means,
container filling means positioned over said belt behind said hopper comprising a charge receiving hopper pivotally supported on said frame and balanced to descend into a container under the influence of the weight of a charge of articles,
a charge measuring element supported over said receiving hopper,
a balance beam supporting said element on said frame and having a counterweight adjustable to be overbalanced by a charge of articles,
a source of articles positioned to discharge continually into said measuring element,
a stop advanceable over said belt to locate a container under said receiving hopper,
rock shaft means actuated by said first solenoid connected to retract said container stop and to actuate said means for discharging containers,
and control means including a balance switch actuated by over-balancing of said balance beam connected through a time delay mechanism to actuate said container discharging means and retract said stop from in front of a container under said receiving hopper.

25. A packing machine for loose articles comprising, container filling means arranged to introduce a heaping measure of articles into an open topped container and position the container with contents so heaped at a covering position, means arranged to position a sheet of heat shrinkable film of larger size than the top of said container over said heaping measure and overhanging the periphery of the container, a cover holding element movable into contact with the top of said container at said covering position and having a soft face uniformly deformable perpendicularly at all points across the area of said container to deflect over said heaped measure, and means for directing heated air against the edges of said sheet of film projecting beyond the sides of said container.

References Cited in the file of this patent

UNITED STATES PATENTS

| | | |
|---|---|---|
| 2,136,901 | Ferguson | Nov. 15, 1938 |
| 2,712,717 | Keller | July 12, 1955 |
| 2,840,963 | Osmond | July 1, 1958 |
| 2,956,382 | Wardell | Oct. 18, 1960 |
| 2,991,608 | Runco | July 11, 1961 |
| 3,014,320 | Harrison | Dec. 26, 1961 |